United States Patent
Doke et al.

[11] Patent Number: 6,134,342
[45] Date of Patent: Oct. 17, 2000

[54] VISUAL INSPECTION METHOD AND APPARATUS FOR CONTACT LENSES

[75] Inventors: Atsuhiro Doke; Minoru Aoki, both of Aichi-ken; Katsumi Maenosono, Kanagawa-ken; Minoru Fujita, Kanagawa-ken; Norihiro Tanaka, Kanagawa-ken; Yasuo Horiguchi, Kanagawa-ken, all of Japan

[73] Assignees: Menicon Co., Ltd., Nagoya; Toshiba Engineering Corporation, Kawasaki, both of Japan

[21] Appl. No.: 08/979,638

[22] Filed: Nov. 28, 1997

Related U.S. Application Data

[63] Continuation of application No. 08/364,289, Dec. 27, 1994, abandoned.

[30] Foreign Application Priority Data

Dec. 27, 1993 [JP] Japan ................................. 5-331764

[51] Int. Cl.[7] ........................................... G06K 9/00
[52] U.S. Cl. ......................................... 382/141; 356/124
[58] Field of Search .................................. 382/100, 141, 382/143, 144, 149, 152, 219, 275; 356/124, 239, 240, 237, 239.1, 239.2, 239.4, 239.5; 206/5.1; 264/2.6; 351/219, 257; D3/264

[56] References Cited

U.S. PATENT DOCUMENTS

| | | | |
|---|---|---|---|
| 3,822,096 | 7/1974 | Wilms et al. | 356/391 |
| 3,871,395 | 3/1975 | Murry | 134/107 |
| 3,894,806 | 7/1975 | Remy et al. | 356/240 |
| 4,072,428 | 2/1978 | Moss | 356/244 |
| 4,665,624 | 5/1987 | Wodis | 33/507 |
| 4,681,442 | 7/1987 | Wagner | 356/237 |
| 4,691,231 | 9/1987 | Fitzmorris et al. | 348/127 |
| 4,841,139 | 6/1989 | Schmalfuss et al. | 250/223 R |
| 4,980,993 | 1/1991 | Umezaki | 451/5 |
| 5,151,752 | 9/1992 | Oono et al. | 356/128 |
| 5,173,738 | 12/1992 | Bieri | 356/124 |
| 5,321,767 | 6/1994 | Murase | 382/149 |
| 5,466,147 | 11/1995 | Appleton et al. | 425/412 |
| 5,528,357 | 6/1996 | Davis | 356/124 |
| 5,542,978 | 8/1996 | Kindt-Larsen et al. | 18/256 |
| 5,574,554 | 11/1996 | Su et al. | 356/239 |
| 6,047,082 | 4/2000 | Rhody et al. | 382/141 |

FOREIGN PATENT DOCUMENTS

| | | |
|---|---|---|
| 0 420 152 | 4/1991 | European Pat. Off. . |
| 0 491 663 | 6/1992 | European Pat. Off. . |
| 2-257007 | 10/1790 | Japan . |
| 63-48431 | 3/1988 | Japan . |
| 4-305144 | 10/1992 | Japan . |
| 4-321186 | 11/1992 | Japan . |

*Primary Examiner*—Jon Chang
*Assistant Examiner*—Jayanti K. Patel
*Attorney, Agent, or Firm*—Oblon, Spivak, McClelland, Maier & Neustadt, P.C.

[57] ABSTRACT

In a contact lens visual inspection method and apparatus, a contact lens insertion portion of a container is first imaged by an image pickup device and then an area which locates on the container and is unnecessary for the visual inspection of a contact lens is extracted from the image of the contact lens insertion portion to form a mask image. Thereafter, a system containing the contact lens insertion portion of the container, the preservation liquid filled in the contact lens insertion portion and the contact lens placed in the contact lens insertion portion is imaged as an inspection object by the imaging device to obtain an inspection object image, the inspection object image is overlapped with the mask image, and the mask image is subtracted from the inspection object image to set as a visual inspection area the area corresponding to a subtracting image obtained by said subtracting step. The defects of the contact lens such as soil, foreign matter, scratch, breakage, peripheral damage, etc. detected for the visual inspection area.

7 Claims, 11 Drawing Sheets

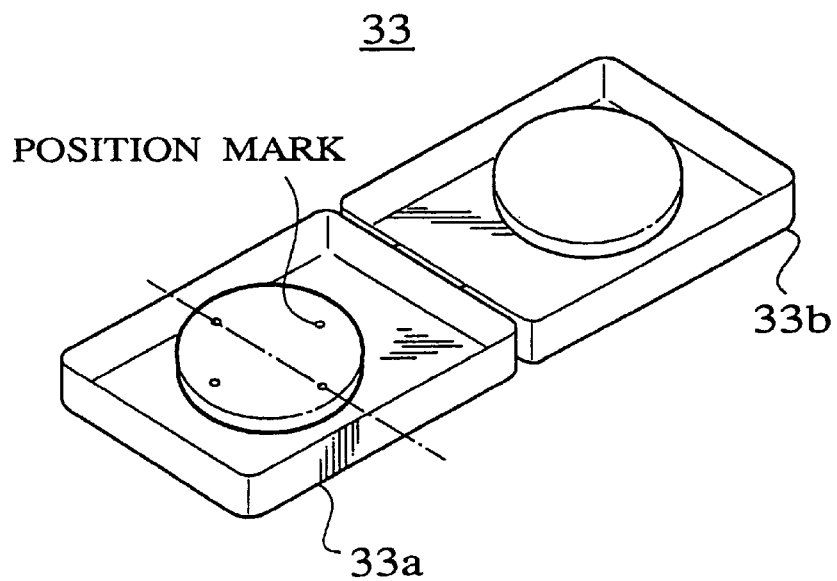
FIG.2 A
FIG.2 B
FIG.3
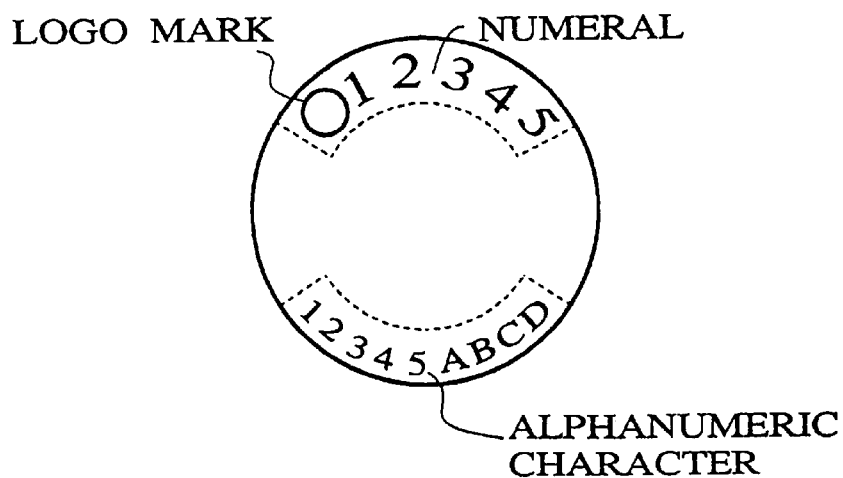

FIG.9
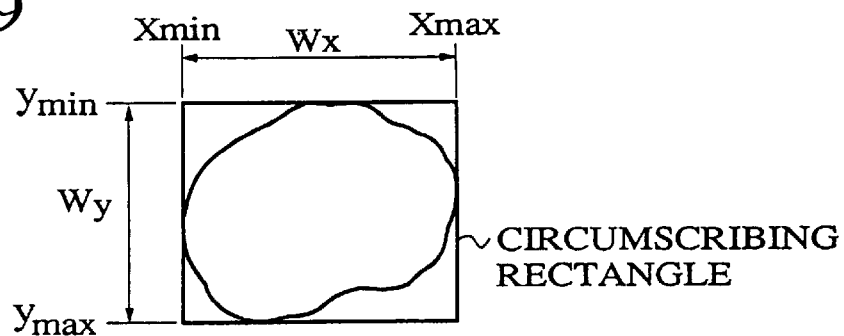
FIG.10
|   | AREA | $X_{min}$ | $X_{max}$ | $y_{min}$ | $y_{max}$ |
|---|------|-----------|-----------|-----------|-----------|
| 1 |      |           |           |           |           |
| 2 |      |           |           |           |           |
| 3 |      |           |           |           |           |
| 4 |      |           |           |           |           |
| ⋮ |      |           |           |           |           |
FIG.11
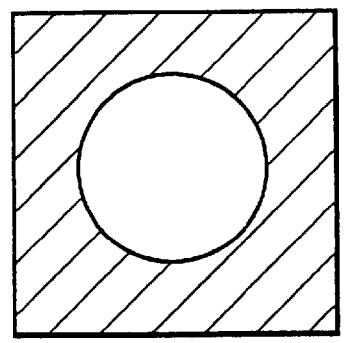

VISUAL INSPECTION METHOD AND APPARATUS FOR CONTACT LENSES

This application is a Continuation of application Ser. No. 08/364,289, filed on Dec. 27, 1994, now abandoned.

BACKGROUND OF THE INVENTION

1. Field of the Invention

This invention relates to visual inspection method and apparatus for performing a visual inspection for contact lenses using an image pickup device to detect defects of contact lenses such as soil, foreign matters, scratches, breakage, peripheral damage, etc. of the contact lenses.

2. Description of Related Art

In order to perform a visual inspection for contact lenses to detect defects of the contact lenses such as soil, foreign matters, scratches, breakage, peripheral damage, etc., the following method has been conventionally utilized. That is, contact lenses are directly projected in an enlarging scale one by one by an optical projector for the visual inspection without being placed in a container (that is, under a condition that these are not protected from an external force), and an operator checks a projected screen to find out the defects.

For example, Japanese Laid-open Patent Application No. 63-48431 which is titled "Lens Inspection Device" discloses a technique in which an image (picture) of a lens is divided into a central part image and a peripheral (profile) part image to measure a binary signal time for each part image and then the quality of the lens (i.e., whether the lens is good or bad) is judged on the basis of the judgment as to whether the binary signal value is within a permissible range.

Furthermore, in a technique as disclosed in Japanese Laid-open Patent application No. 2-257007 which is titled "Inspection Device for Peripheral Chip of Contact Lens", the peripheral portion of a contact lens is imaged by an image pickup device to obtain a binary image of the contact lens, then the position coordinates of the peripheral portion are detected on the basis of the binary image by detection means, and then the least square quadratic approximation is performed on the basis of the detected position coordinates. Through this approximation method, the peripheral chip of the contact lens can be detected on the basis of the following parameters: the difference between the position coordinates detected by the detection means, which would be originally a very small value if the contact lens has no chip; the quadratic coefficient of the quadratic approximation curve; and the width of the imaged peripheral portion.

In a technique as disclosed in Japanese Laid-open Patent Application No. 4-305144 which is titled "Inspection Device for Peripheral Chip of contact Lens", the peripheral chip of the contact lens is detected by a contact lens detection means for converting an image of the contact lens into electrical signals, an image processing means for converting the electrical signal to image (picture) signals to extract only the peripheral portion of the contact lens, an arithmetical processing and judging means for processing the extracted portion to search a peripheral chip and judging the peripheral chip of the contact lens, and a transferring means for transferring the contact lens to a position at which the contact lens detection means can detect the contact lens.

Still furthermore, in a technique as disclosed in Japanese Laid-open Patent Application No. 4-321186 which is titled "Process and Device for Inspecting Optical Articles, particularly Optical Articles associated with Eyes, and Device for Illuminating Transparent Object Being Inspected", the image of an article being inspected is formed, and then defects of the imaged article being inspected is subjected to an image analysis to detect the defect. In the image analysis, a two-dimensional high-contrast image is formed to set an image area for a visualized defect, and then the defect image is compared with a threshold above "1".

In the conventional visual inspection devices for contact lenses as described above, the contact lenses has been inspected one by one using the optical projector or CCD image pickup device while they are not placed in containers as described above. Therefore, the inspected contact lenses are liable to be damaged (soiled, scratched or the like) during a period from the end of the visual inspection till the time when the contact lens is put into a storage container, and thus much attention must be paid to the handling of the contact lens. Particularly with respect to a soft contact lens, it is more liable to be soiled or scratched, and thus the visual inspection of a contact lens has been increasingly required to be performed while the contact lens is placed in a container (that is, under such a condition that the contact lens is protected from the external force).

SUMMARY OF THE INVENTION

An object of the present invention is to provide visual inspection method and apparatus for contact lenses in which a visual inspection for contact lenses can be performed while each contact lens is placed in a container filled with preservation liquid.

In order to attain the above object, according to one aspect of the present invention, a contact lens visual inspection method comprises a mask image forming step of imaging a contact lens insertion portion of a contact lens insertion container using an image pickup device to form an image of the contact lens insertion portion and then forming, on the basis of the image obtained through the image pickup operation, a mask image obtained by extracting an area which exists on a container and is unnecessary for the visual inspection of a contact lens, a visual inspection area determining step of imaging, using the image pickup device, a system containing the contact lens insertion portion of the container, the contact lens placed in the contact lens insertion portion and the preservation liquid filled in the contact lens insertion portion to obtain an inspection object image, and then overlapping the inspection object image obtained through the image pickup operation with the mask image to set as a visual inspection area an area obtained by subtracting the mask image from the inspection object image, and a visual inspection step of detecting defects of the contact lens such as soil, foreign matters, scratches, breakage, peripheral damage, etc. for the visual inspection area which is obtained by subtracting the mask image from the inspection object image.

Between the mask image forming step and the visual inspection area determining step may be further provided a deaerating step of inserting the contact lens into the container in a state where the preservation liquid is filled in the container and then applying ultrasonic wave to the container to deaerate bubbles occurring on the inspection object.

Furthermore, at least two position marks for position detection are provided at predetermined positions of the container, and the visual inspection area determining step comprises the steps of calculating the coordinate value of each position mark when the mask image is formed and when the inspection object image is formed, enlarging, reducing, rotating or parallel-displacing the inspection object image or mask image on the basis of the difference between the coordinate values of the position mark at the both image-forming times so that the inspection object image and the mask image are overlapped with each other, and setting as the visual inspection area the area which is obtained by subtracting the mask image from the inspection object image.

The visual inspection step comprises the steps of dividing brightness information obtained on pixel basis by the image pickup device into plural areas at predetermined angular intervals, summing the brightness information every area and detecting a stamp range of marks and characters on the basis of the sum.

Furthermore, the visual inspection step comprises the steps of extracting the periphery of the contact lens on the basis of the brightness information which is obtained on pixel basis by the image pickup device, calculating the distance between the extracted periphery and the center of the extracted periphery every fixed angular interval, calculating plural average values of the obtained distance values by weighting average method in which the distance values are averaged while varying the number of the distance values to be used for the averaging, thereby, obtaining an average value in accordance with the number of the used distance values, and detecting the peripheral damage of the contact lens on the basis of the difference of the plural average values.

The mask image forming step includes a mask image dilating step of dilating, by at least one pixel, the surrounding of the area which exists on the container and is unnecessary for the visual inspection of the contact lens.

Furthermore, the visual inspection step includes the step of dilating, by at least one pixel, the surrounding of the periphery of the contact lens which is cut out by the subtraction of the mask image from the inspection object image, thereby linking the surrounding of the periphery.

According to another aspect of the present invention, the visual inspection apparatus for contact lenses includes a mask image forming means for imaging a contact lens insertion portion of a contact lens insertion container using an image pickup device to form an image corresponding to the contact lens insertion portion, and then forming a mask image by extracting from the image obtained through the image pickup operation an area which exists on a container and is unnecessary for the visual inspection of a contact lens, a visual inspection area determining means for imaging, using the image pickup device, a system containing the contact lens insertion portion of the container, the preservation liquid filled in the contact lens insertion portion and the contact lens placed in the contact lens insertion portion to obtain an inspection object image, overlapping the inspection object image with the mask image to subtract the mask image from the inspection object image to obtain a subtracting image, and setting as a visual inspection area an area corresponding to the subtracting image obtained by subtracting the mask image form the inspection object image, and a visual inspection means for detecting the defects of the contact lens such as soil, foreign matters, scratches, breakage, peripheral damage, etc. for the visual inspection area.

The bottom portion of the contact lens insertion portion of the container may be designed in a spherical shape like a lens.

The imaging operation of the image pickup device is carried out under a bright field illumination for detecting back defects, and a dark field illumination for detecting white defects, and logo marks and characters which are stamped on the contact lens.

According to the present invention, in the mask image forming step, the contact lens insertion portion of the contact lens insertion container is imaged by the image pickup device and then the area which exists on the container and is unnecessary for the visual inspection of the contact lens is extracted from the image obtained through the image pickup operation to obtain the mask image. In the visual inspection area determining step, the system containing the contact lens insertion potion of the container, the preservation liquid filled in the contact lens insertion portion and the contact lens placed in the contact lens insertion portion is imaged by the image pickup device to obtain the inspection object image. Thereafter, the inspection object image obtained through the image pickup operation is overlapped with the mask image and the mask image is subtracted from the inspection object image to obtain the subtracting image. The area corresponding to the subtracting image is set as the visual inspection area. In the visual inspection step, the defects of the contact lens such as soil, foreign matters, scratches, breakage, peripheral dame, etc. are detected for the visual inspection area which is obtained by subtracting the mask image form the inspection object image.

In the visual inspection area determining step, the contact lens is placed in the container while the preservation liquid is filled in the container, and then ultrasonic wave is applied to the container to deaerate bubbles occurring in the inspection object (the system containing the contact lens insertion portion, the preservation liquid and the contact lens). Thereafter, the visual inspection of the contact lens is performed.

In the visual inspection area determining step, the coordinate values of the position marks which are beforehand provided on the container are calculated twice at the time when the mask image is formed (at the mask-image forming time) and at the time when the inspection object image is formed (at the object-image forming time), and the inspection object image or the mask image is enlarged, reduced; rotated or parallel displaced on the basis of the difference between these coordinate values calculated at the mask-image forming time and the object-image forming time so that the inspection object image and the mask image are overlapped with each other. Thereafter, the mask image is subtracted from the inspection object image to obtain the subtracting image, and the area corresponding to the subtracting image is set as the visual inspection area.

In the visual inspection step, the brightness information which is obtained on pixel basis by the image pickup device is divided into plural data areas at predetermined angular intervals, the brightness information is summed every area and a stamp range of marks and characters is detected on the basis of the sum result.

Further, in the visual inspection step, the periphery of the contact lens is extracted on the basis of the brightness information which is obtained on pixel basis by the image pickup device, and the distance between the extracted periphery and the center of the extracted periphery is calculated every fixed angular interval to obtain distance values every fixed angular interval. Thereafter, the distance values thus obtained are averaged while varying the number of the distance values used for the averaging (i.e., using the weighting average method) to thereby obtain plural average values for the distance values in accordance with the respective number of distance values, and the peripheral damage of the contact lens is detected on the basis of the difference of the plural average values.

The mask image forming step includes a mask image dilating step of dilating, by at least one pixel, the surrounding of the area which exists on the container and is unnecessary for the visual inspection of the contact lens.

Furthermore, the visual inspection step includes a step of dilating, by at least one pixel, the surrounding of the periphery of the contact lens which is cut out by the subtraction of the mask image from the inspection object image, thereby linking the cut-out surrounding.

The bottom portion of the contact lens insertion portion of the container may be designed in a spherical shape like a lens to converge illumination light.

BRIEF DESCRIPTION OF THE DRAWINGS

FIG. 2 is a schematic diagram showing the shape of a container for a contact lens;

FIG. 3 is a schematic diagram showing the external appearance of the contact lens;

FIG. 9 is a diagram showing a circumscribing rectangle;

FIG. 10 is a diagram of a tabling example on the basis of the circumscribing rectangle;

FIG. 11 is a diagram showing a container quality judging mask;

DETAILED DESCRIPTION OF THE PREFERRED EMBODIMENT

A preferred embodiment according to the present invention will be described with reference to the accompanying drawings.

Figure 1:
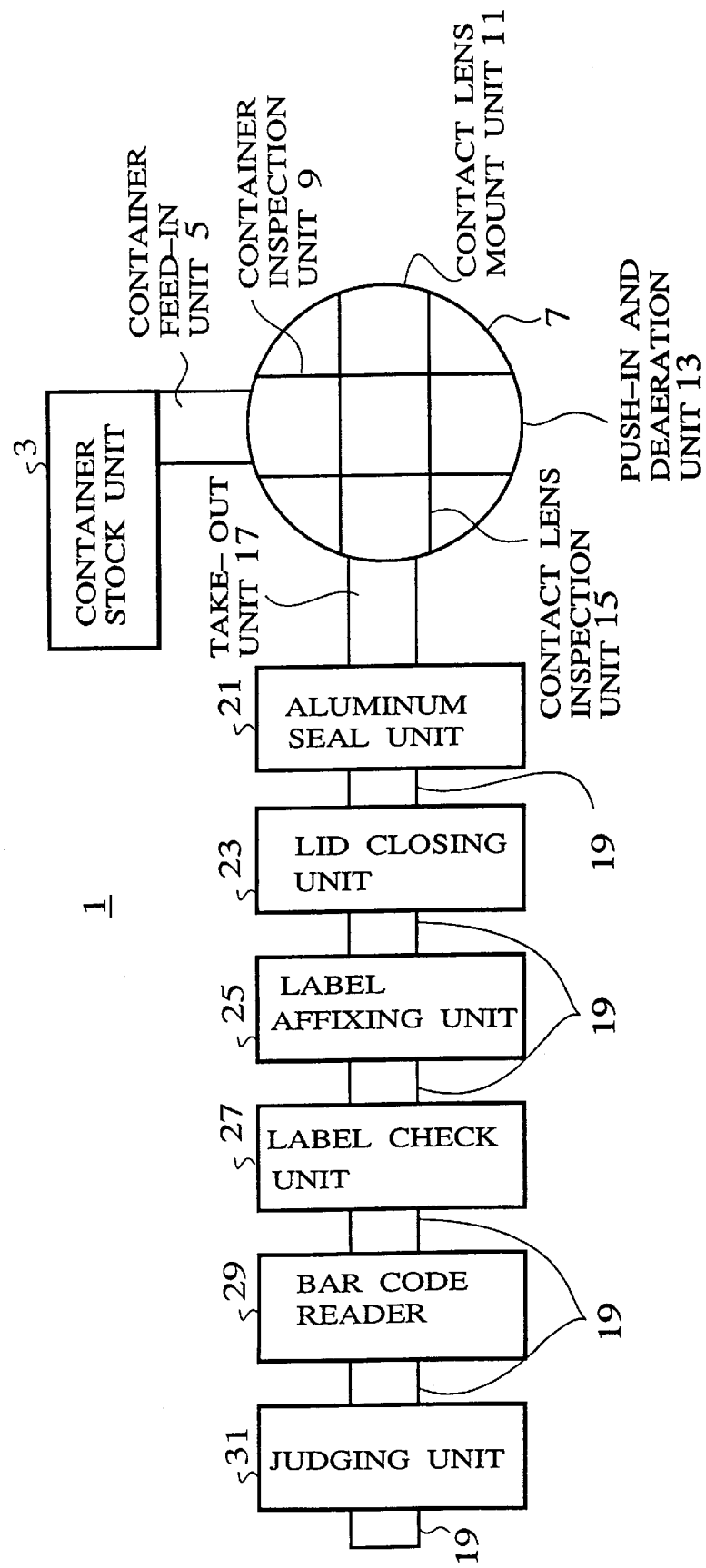
FIG. 1 is a block diagram showing the construction of a contact lens visual inspection apparatus according to the present invention.

FIG. 1 is a block diagram showing the construction of a contact lens visual inspection apparatus according to the present invention.

As shown in FIG. 1, the contact lens visual inspection apparatus 1 includes a container stock unit 3, a container feed-in unit 5, a container transferring table unit 7, a container inspection unit 9, a contact lens mount unit 11, a push-in/deaeration unit 13, a contact lens inspection unit 15, a take-out unit 17, a container feeding line 19, an aluminum seal unit 21, a lid closing unit 23, a label affixing unit 25, a label check unit 27, a bar cod reader 29 and a judging unit 31. The contact lens visual inspection apparatus 1 serves to inspect the external appearance (that is, perform the visual inspection) of a container 33 comprising a contact lens insertion portion 33a having a bottom surface which is designed in a spherical shape like lens, and a lid portion 33b as shown in FIG. 2, and to inspect the external appearance of a contact lens on which a logo mark, numerals and alphanumeric characters are stamped as shown in FIG. 3.

The container feed-in unit 5 serves to take out a container 33 from the container stock unit 3 in which plural containers 33 are stocked, and place the container 33 on the container transferring table unit 7 with the lid portion 33b opened. On the container transferring table unit 7 can be placed plural (four) containers 33 at angular intervals of 90°.

The container transferring table unit 7 comprises a disc-shaped table having windows which are formed so as to confront the contact lens insertion portions 33a of the containers 33 arranged at angular intervals of 90°, and a table operating unit (not shown) for transferring the table. The table is rotated by every 90° using the table operating unit to successively feed the container 33 to the container inspection unit 9, the contact lens mount unit 11, the push-in/deaeration unit 13 and the contact lens inspection unit 15 in this order.

Figure 4:
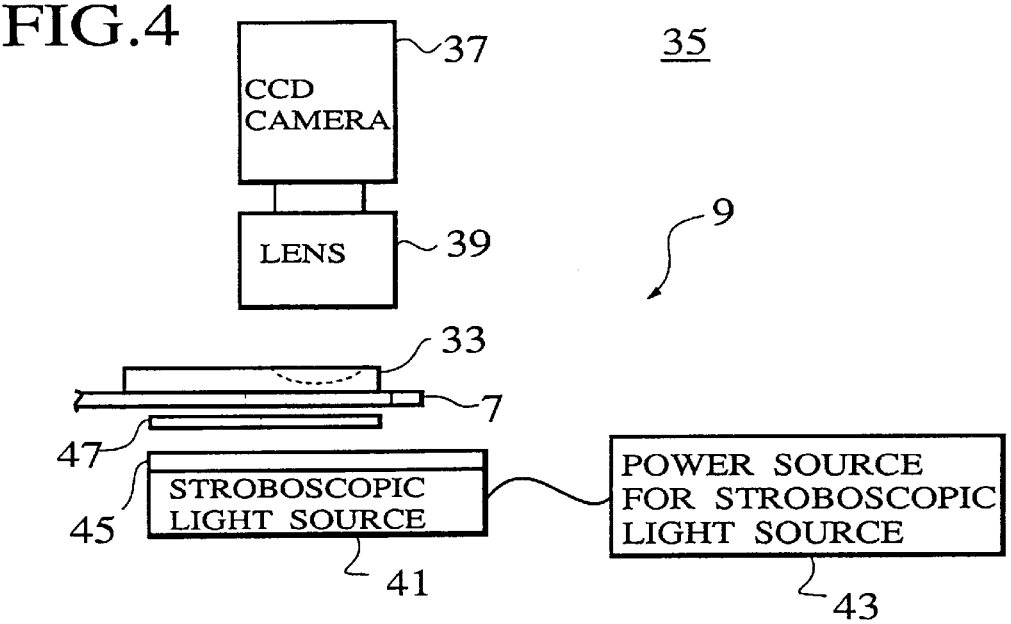
FIG. 4 is a diagram showing a container inspection stage.
Figure 5:
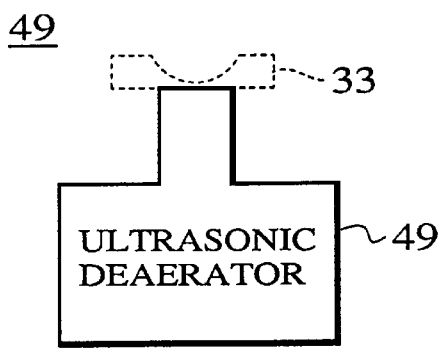
FIG. 5 is a block diagram showing an ultrasonic deaerating device.

The container inspection unit 9 serves to fill a predetermined amount of preservation liquid into the contact lens insertion portion 33a of the container 33 placed in the container transferring table 7, and then inspect the external appearance of the contact lens insertion portion 33a by the container inspection stage 35 (i.e., perform the visual inspection for the container). As shown in FIG. 4, the container inspection stage 35 includes a CCD camera 37 for obtaining brightness information on pixel basis at a gradation of 0 to 255, a lens 39, a stroboscopic light source 41, a power source 43 for the stroboscopic light source 41, a milky diffusion plate 45 for diffusing light from the stroboscopic light source 41, and a bright field/dark field illumination switching unit 47 for converting the light emitted from the stroboscopic light source 41 to light for bright field illumination or dark field illumination.

The contact lens mount unit 11 serves to mount the contact lens on the contact lens insertion portion 33a so that the contact lens is floated on the preservation liquid filled in the contact lens insertion portion 33a.

The push-in/dearation unit 13 serves to push the contact lens floated on the preservation liquid onto the bottom portion of the contact lens insertion portion 33a and deaerate bubbles occurring in this pushing operation by the ultrasonic deaerating device 49.

The contact lens inspection unit 15 serves to inspect the external appearance of the contact lens placed in the contact lens insertion portion 33a by the contact lens inspection stage 55. The contact lens inspection stage 55 has the same construction as the container inspection stage 35 shown in FIG. 4.

The take-out unit 17 serves to take out to the aluminum seal unit 21 the container 33 and the contact lens placed in the container 33, which have been inspected.

The container feeding line 19 serves to successively feed the container 33 and the contact lens placed in the container 33 from the aluminum seal unit 21 to the lid closing unit 23, the label affixing unit 25, the label check unit 27, the bar code reader 29 and the judging unit 31 in this order.

The aluminum seal unit 21 serves to seal the contact lens insertion portion 33a with aluminum foil. The lid closing unit 23 serves to place the lid portion 33b of the container 33 on a predetermined portion of the contact lens insertion portion 33a side to close the lid. The label affixing unit 25 affixes onto the surface of the container 33 a label on which the specification, lost, etc. of the contact lens placed in the container 33 and bar codes thereof are printed.

Figure 6:
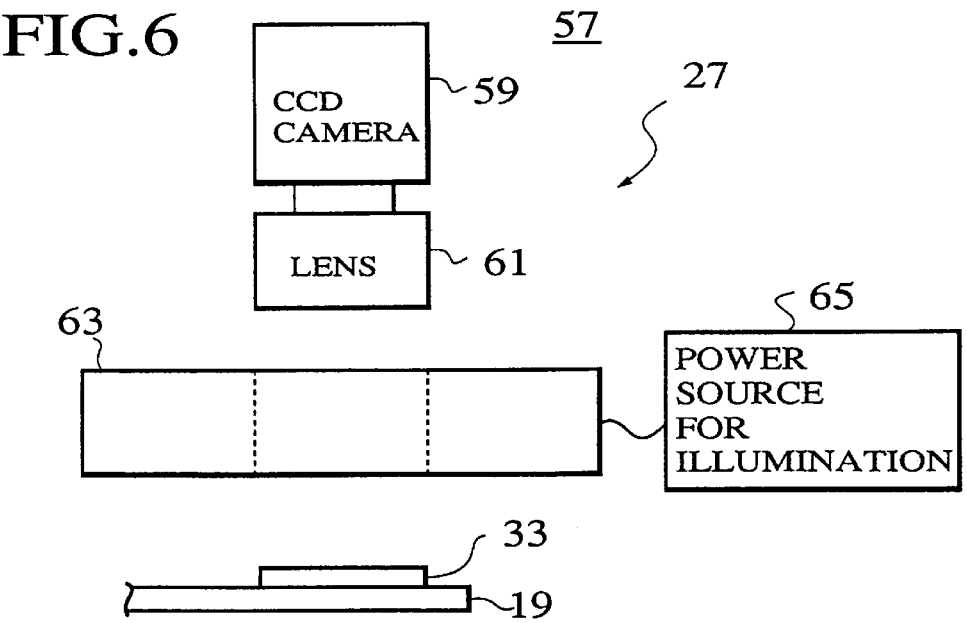
FIG. 6 is a diagram showing a label check stage.

The label check unit 27 serves to inspect, with the label check stage 57, whether a label is affixed to the container 33, whether the position of the label affixed to the container 33 is within a permissible range and whether the position of the specification, lot number, etc. of the contact lens which are printed on the label is within a permissible range. As shown in FIG. 6, the label check stage 57 includes a CCD camera 59 for obtaining brightness information on pixel basis at a gradation of 0 to 255, a lens 61, a lamp house 63 for emitting illumination light, and a illumination power source 65.

The bar code reader 29 serves to read out bar codes of the container 33 fed on the container feeding line 19 to identify a manufacturing number, etc. of the contact lens placed in the container 33.

The judging unit 31 serves to classify the contact lens placed in the container 33 into "good article" and "bad article" on the basis of the visual inspection result and the read-out result of the bar code reader 29, that is, it serves to judge whether the contact lens placed in the container 33 is "good" or "bad" (i.e., estimate the quality of the contact lens).

Figure 7:
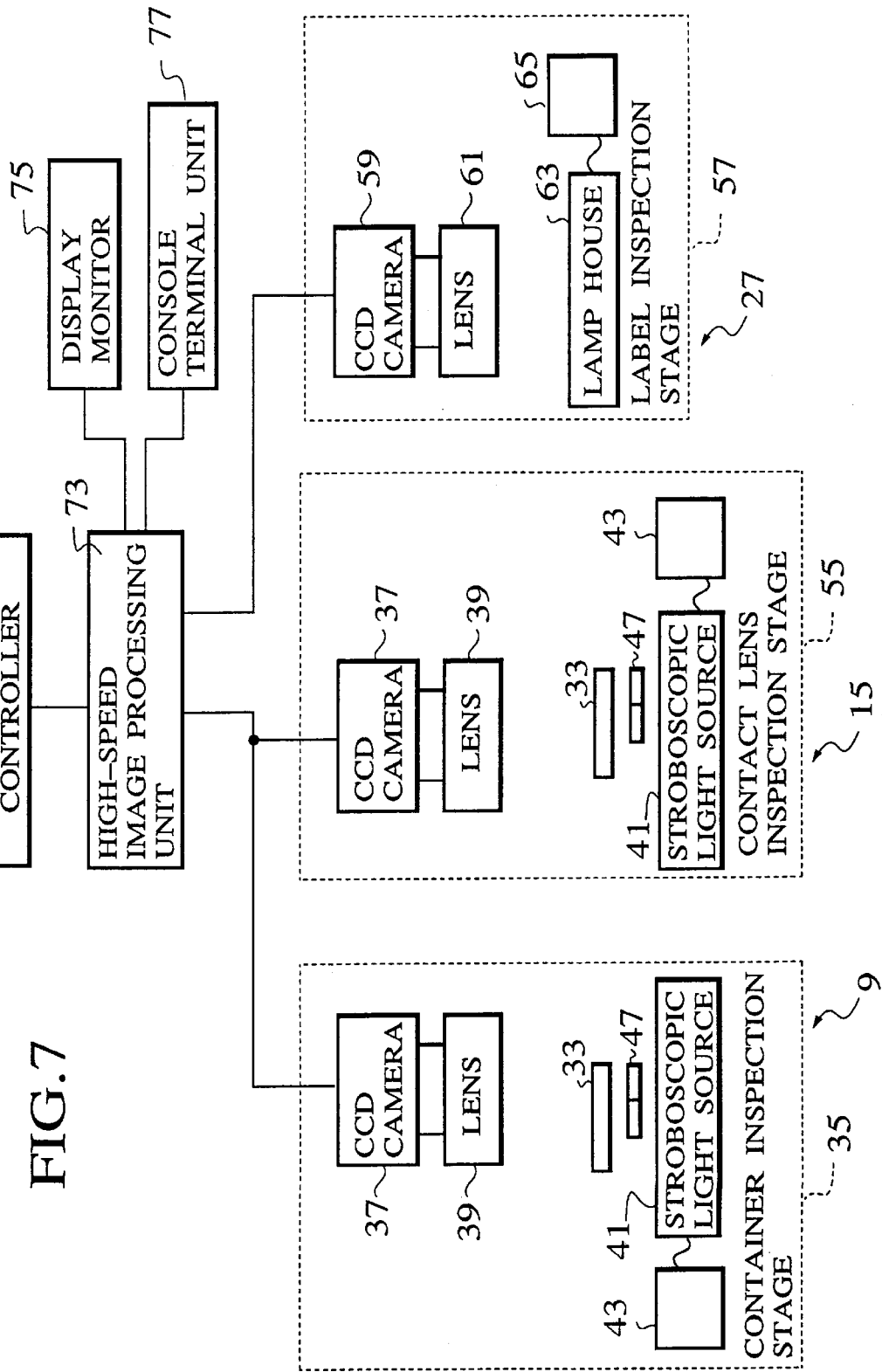
FIG. 7 is a block diagram showing an operation controller for controlling the operation of a container inspection unit, a contact lens inspection unit and a label check unit.

As shown in FIG. 7, each of the container inspection unit 9, the contact lens inspection unit 15 and the label inspection unit 25 commonly includes the inspection controller 71 for controlling the operation of these units, the high-speed image processing unit 73 for performing image processing such as a binarizing, and affine transformation, etc. for pixel-based brightness information which is obtained by each CCD camera 37, 37, 59 in the following operations: <container inspection under bright field illumination, dark field illumination>, <contact lens inspection under bright field illumination > and <contact lens inspection under dark field illumination>, a display monitor 75 for displaying an image, and the console terminal unit 77 for setting a binary threshold value and outputting an image display command to the inspection controller 71. The inspection controller 71 serves to take in data from the high-speed image processing unit 73 to judge (estimate) the quality of the container 33 and the contact lens, and supply an instruction to the judging unit 31.

Next, the whole operation of the contact lens visual inspection apparatus 1 thus constructed will be described hereunder.

When an operator starts a visual inspecting operation, the container feed-in unit 5 takes out a container 33 from the container stock unit 3 and places it on the container inspection unit 9 of the container transferring table 7.

In the container inspection unit 9, the preservation liquid is fully filled into the contact lens insertion portion 33a of the placed container 33. Thereafter, the external appearance of the container 33 is inspected using the container visual inspection stage 33. If the container 33 has a visual defect, its fact is informed (transmitted) from the inspection controller 71 to the judging unit 31. Subsequently, the table is rotated by 90° by the container transferring table unit 7 to feed the container 33 to the contact lens mount unit 11.

In the contact lens mount unit 11, the contact lens is mounted in the contact lens insertion portion 33a of the container 33 so that the contact lens is floated on the preservation liquid which is filled in the contact lens insertion portion 33a. Thereafter, the table is further rotated by 90° by the container transferring table unit 7 to feed the container 33 to the push-in/deaeration unit 13.

In the push-in/deaeration unit 13, the contact lens which is placed in the container 33 while floated on the preservation liquid is pushed in onto the bottom portion of the contact lens insertion portion 33a, and bubbles occurring in the preservation liquid are deaerated by the ultrasonic deaerator 49. Subsequently, the table is further rotated by 90° by the container transferring table unit 7.

In the contact lens inspection unit 15, the external appearance of the contact lens placed in the contact lens insertion portion 33a is inspected by the contact lens inspection stage 55. If the container 33 has a visual defect, its fact is transmitted from the inspection controller 71 to the judging unit 31. Thereafter, the inspected container 33 and the contact lens placed in the container 33 are fed out to the aluminum seal un it 21 by the take-out unit 17.

In the aluminum seal unit 21, the contact lens insertion portion 33a is sealed with aluminum foil, and then the sealed container 33 is fed to the lid closing unit 23 by the container feeding line 19.

In the lid closing unit 23, the lid portion 33b of the container 33 is put on a predetermined portion of the contact lens insertion portion 33a to close the container 33, and then the container 33 closed with the lid portion 33b is fed to the label affixing unit 25 by the container feeding line 19.

In the label affixing unit 25, a label on which the specification and lot number, etc. of the contact lens placed in the container 33 are printed is affixed to the surface of the container 33, and then the container 33 is fed to the label check unit 27 by the container feeding line 19.

In the label check unit 27, it is checked whether the label is affixed on the container 33, whether the affix position of the label is within a permissible range and whether the print position of the label is within a permissible range. If the label has a defect, its fact is transmitted from the inspection controller 71 to the judging unit 31, and then the container 33 is fed to the bar code reader 29 by the container feeding line 19.

In the bar code reader 29, the bar code affixed to the container 33 is read out, and the read-out result is transmitted from the inspection controller 71 to the judging unit 31. Thereafter, the container 33 is fed to the judging unit 31 by the container feeding line 19.

In the judging unit 31, the contact lens placed in the container 33 is classified into a good article and a bad article (that is, the quality of the contact lens is estimated) on the basis of the inspection result of the container inspection unit 9, the contact lens inspection unit 15 and the label check unit 27, and the read-out result of the bar code reader 29. Thereafter, the container 33 and the contact lens placed therein are fed out through the container feeding line 19 to the outside of the contact lens visual inspection apparatus 1.

Next, the visual inspection operation for the container 33 and the contact lens will be described.

The visual inspection for the container 33 and the contact lens are performed using both of bright field illumination under which defects such as black soil, scratches, etc. are easily detected, and dark field illumination under which defects such as white soil, scratches, etc. are easily detected. That is, in a first process (container inspecting process), an inspection object (i.e., container 33) is imaged by the CCD camera 37 under the bright field illumination and under the dark field illumination in a state where the preservation liquid is filled in the container 33. In this process, the center of gravity of the position marks is calculated, and a bright field mask pattern and a dark field mask pattern which are used as a mask for preventing a defective portion of the container 33 from being erroneously detected as a defective portion of the contact lens are formed. Further, the external appearance of the container 33 is inspected. Thereafter, in a second process (contact lens inspecting process), an inspection object (a combined system containing the container, the preservation liquid filled in the container and the contact lens placed in the container) is imaged by the CCD camera 37 under the bright field illumination while the liquid preservation liquid and the contact lens are provided in the container 33. In this process, the center of gravity of the position marks are also calculated to positionally match the inspection object in the first process with that in the second process, and the defective portion of the container 33 such as black soil, scratches, etc. is masked using the bright field mask pattern on the basis of the calculated center of gravity of the position marks to detect defects such as black soil, scratches, etc. of the contact lens. Thereafter, the illumination is changed to the dark field illumination by the illumination switching unit 47, and the inspection object is imaged by the CCD camera 37 under the dark field illumination. In this process, the defective portion of the container 33 such as the white soil, scratches, etc. is masked with the dark field mask pattern on the basis of the center of gravity of the position marks to detect the peripheral damage of the contact lens, a range (area) of the logo mark, the numerals and alphanumeric characters which are stamped on the contact lens, and the defects such as the white soil, scratches, etc.

Next, each inspection operation will be described in detail.

Container Inspection under Bright Field Illumination, Dark Field Illumination

The visual inspection operation of the container 33 under the bright field illumination and the dark field illumination will be described with reference to a flowchart of FIG. 8.

Position Mark Detecting Operation

First, an operation of detecting the position marks of the container 33 shown in FIG. 2 with the bright field illumination will be described.

Upon start of the visual inspection operation of the contact lens, the inspection controller 71 instructs the bright field/dark field illumination switching unit 47 to change the illumination to the bright field illumination, whereby the current illumination is set to the bright field illumination. Thereafter, the preservation liquid is filled into the container 33, and the contact lens insertion portion 33a is imaged by the CCD camera 37 to obtain a container original image (step ST1). At this time, the average brightness of a predetermined center position is calculated because the illuminance of the bright field illumination may disperse.

Thereafter, an averaging filter is applied to the container original image at a predetermined number of times to make the whole image vague, thereby obtaining a container averaged image (step ST3). The container original image is subtracted from the container averaged image to obtain a container-profile extracted image in which the defects such as the soil, scratches, etc. of the container 33, the position marks, the profile of the contact lens insertion portion 33a, etc. are extracted in white color (step ST5, ST7).

The obtained container profile extracted image and a positioning mask which is used to detect the position marks and beforehand stored are logically added with each other, and then the addition result is binarized with a threshold value which is calculated on the basis of the average illuminance of the center position, thereby obtaining a mark cut-out image (steps ST9, ST11). Through this operation, the brightness of the position marks and the profile portion of the contact lens insertion portion 33a is equal to "255", and the brightness of the other portions is equal to "0".

Figure 8:
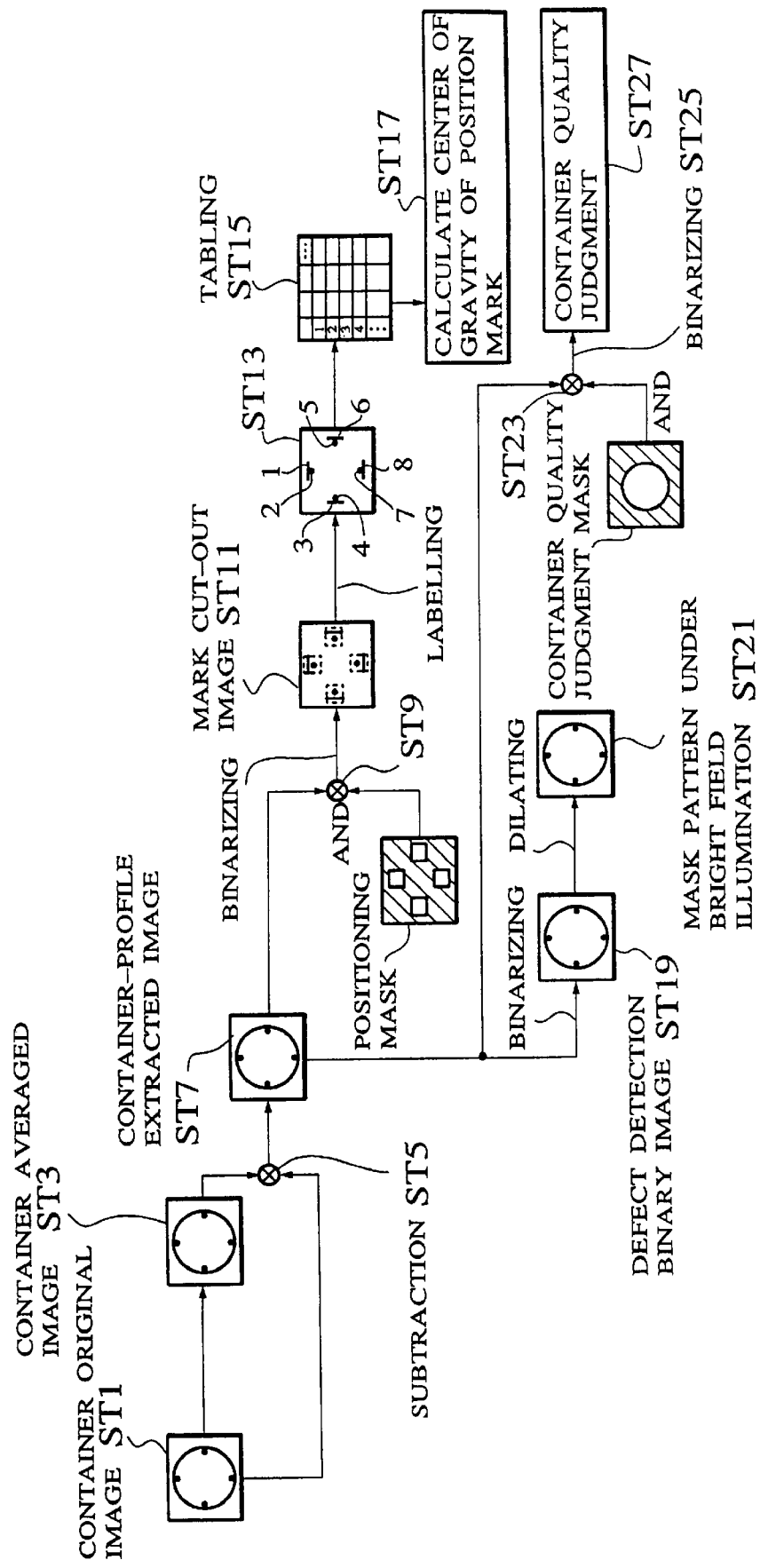
FIG. 8 is a diagram showing the flow of a container inspection operation under light visual-field illumination.

Thereafter, "255"-brightness portions of the mark cut-out image (which correspond to the position marks, the profile of the contact lens insertion portion 33a) are successively numbered from the upper portion of the screen as shown in the step ST13 of FIG. 8, thereby performing a labelling operation (step ST13). In step ST13, numbers of 1 to 8 represent labelling numbers of the cut-out container profile extracted image and the position mark extracted image.

Subsequently, the "255"-brightness portion is circumscribed with a rectangle as shown in FIG. 9 to calculate the maximum value xmax in the x-direction, the minimum value xmin in the x-direction, the maximum value ymax in the y-direction and the minimum value ymin in the y-direction, and the width Wx is the x-direction ant the width Wy in the y-direction of the circumscribed rectangle is calculated on the basis of the above maximum and minimum values. In addition, the area (number of pixels) of the "255"-brightness portion is calculated. These calculated values are tabled by allocating the numbers to these values as shown in FIG. 10 (step ST15).

Thereafter, it is judged whether the width Wx, the width Wy and the area obtained through the above tabling are within predetermined ranges which are preset in correspondence with the position marks, respectively. If these are within the respective permissible ranges, the "255"-brightness portion having these values is detected as a position mark.

Subsequently, the coordinate of the center of gravity of the position mark is calculated on the basis of the width Wx and the width Wy of the position mark, and stored (step ST17).

Bright Field Mask Pattern, Dark Field Mask Pattern Forming Operation

Next, the mask pattern forming operation will be described. In the mask pattern forming operation, the defective portions of the container 33 such as the soil, the scratches, etc. of the container 33 are removed from the inspection object of the contact lens so that these defective portions are prevented from being erroneously judged as the soil, the scratch, etc. of the contact lens. First, an operation of forming a bright field illumination mask pattern using the bright field illumination will be described.

The profile extracted image is subjected to the binarizing with the threshold value which is calculated on the basis of the average illuminance at the center portion as described above, thereby obtaining a defect detection binary image (step ST19).

Thereafter, in consideration of an overlap error between the contact lens image and the mask pattern, the brightness of a portion which surrounds the "255"-brightness portion in the defect detection binary image and dilates outwardly by one pixel from the boundary of the "255"-brightness portion (this portion is hereinafter referred to as "surrounding portion") is converted from "0" to "255" by a spatial filter. With this conversion, the defective portion of the container 33 is outwardly dilated by at least one pixel, and the bright field mask pattern is formed and stored (step ST21). The mask area of the bright field mask pattern can be broadened in correspondence with the positioning precision for the (container+contact lens) image by increasing the frequency of execution of the dilating processing as described above.

Further, a dark field mask pattern is also formed and then stored like the bright field mask pattern forming operation. With respect to the dark field illumination, no detection of the position marks is carried out, and the data obtained under the bright field illumination are also used in this case. Further, with respect to the dark field illumination, inversely to the bright field illumination, the container averaged image is subtracted from the container original image to obtain a container profile extracted image in which the defects such as the soil, the scratches, etc. of the container 33, the position marks, the profile of the contact lens insertion portion 33*a*, etc. are extracted in white color. The container profile extracted image is subjected to the binarizing with a predetermined threshold value to obtain a defect detection binary image. For the dark field illumination, the container averaged image is subtracted from the container original image inversely to the bright field illumination, and thus like the defect detection binary image under the bright field illumination, the defect detection binary image under the dark field illumination has the defective portion of "255"-brightness and the other portions of "0"-brightness.

Quality (good or bad) Judging Operation of Container

Next, the quality judging operation of the container 33 will be described.

A container quality (good or bad) judging mask as shown in FIG. 11 is beforehand stored to inspect only the center portion of the container 33. The profile extracted image under the bright field illumination and the container quality judging mask are added to obtain an image corresponding to only the center portion of the container 33, and then the image is binarized (steps ST23, ST25). Subsequently, the number of pixels for a portion whose brightness is set to 255" due to the soil, the scratches or other defect is calculated on the basis of the image. Likewise, for the dark field illumination, the number of pixels for a portion whose brightness is set to "255" due to the soil, the scratch or other defect is calculated. If these pixel numbers exceed predetermined values, the quality is judged to be bad (step ST27).

Contact Lens Inspection under Bright Field Illumination

Figure 12:
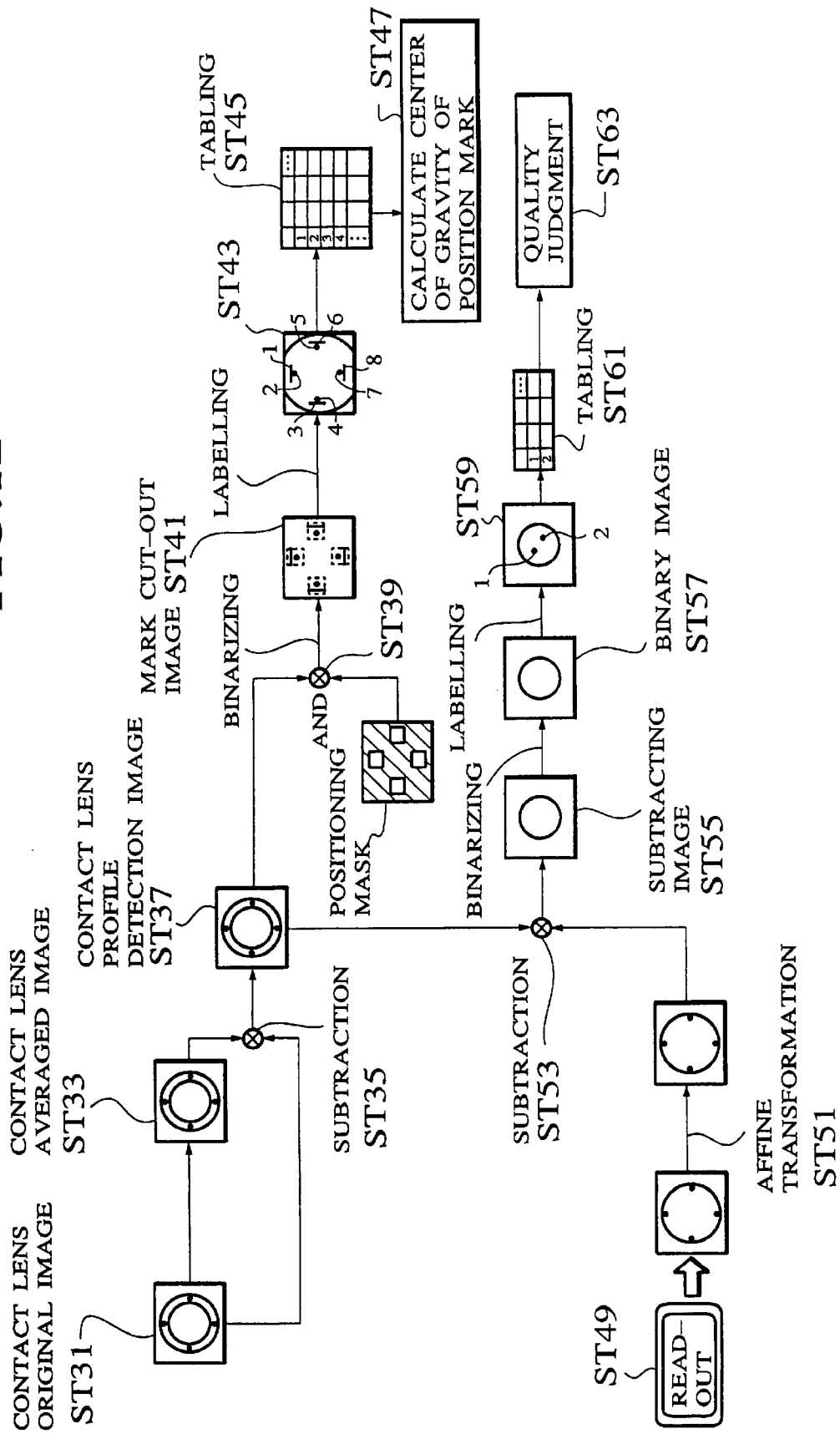
FIG. 12 is a diagram showing the flow of a contact lens inspection operation under bright field illumination.

Next, the visual inspection operation of the contact lens under the light visual illumination will be described with reference to a flowchart of FIG. 12.

Positioning Mark Detecting Operation

First, the position mark detecting operation will be described.

The inspection control unit 71 outputs an instruction for changing the illumination to the bright field illumination, and with this instruction the illumination is et to the bright field illumination. Subsequently, the contact lens insertion portion 33*a* is imaged by the CCD camera 37 to obtain a contact lens original image (step ST31). At this time, the average brightness at a predetermined center portion is obtained because the illuminance of the bright field illumination is dispersed.

Thereafter, the inspection controller 71 applies an averaging filter to the contact lens original image at a predetermined number of times to make the whole image vague, thereby obtaining a contact lens averaged image (step ST3). The contact lens original image is subtracted from the contact lens averaged image to obtain a contact lens profile extracted image in which the defects such as the soil, scratches, etc. of the contact lens, the position marks, the profile of the contact lens insertion portion 33*a*, etc. are extracted as white color (steps ST35, ST37).

Thereafter, the obtained contact lens profile extracted image and a positioning mask which is used to detect the position marks and beforehand stored are logically added with each other, and then the addition result is binarized with a threshold value which is calculated on the basis of the average illuminance of the center portion, thereby obtaining a mark cut-out image (steps ST39, ST41). Thereafter, the mark cut-out image is labelled as shown in step ST43 of FIG. 12, and then tabled on the basis of the label (steps ST43, ST45) to calculate the coordinate of the center of gravity of the position mark like the position mark detecting operation (step ST47).

Contact Lens Defect Detecting Operation

Next, the contact lens defect detecting operation under the bright field illumination will be described.

First, the bright field mask pattern and the coordinate of the center of gravity of the position marks thereof (hereinafter referred to as "gravity-center coordinate") which are stored are read out (step ST49). In order to match the read-out gravity-center coordinate with the gravity-center coordinate which is calculated on the basis of the contact lens original image, the enlarging, reducing, rotating and parallel displacing processing is conducted on the bright field mask pattern by the affine transformation (step ST51).

The subtraction processing is conducted on the profile extracted image as described above and the bright field mask pattern which is subjected to the enlarging, reducing, rotating and parallel-displacing processing, thereby obtaining a subtracting image (step ST53, ST55). The subtracting image is binarized to obtain a binary image (step ST57). Through this process, the defects such as the soil, scratch, etc. of the container 33, the profile of the contact lens insertion portion 33*a* and the position mark portion are removed from the inspection object.

At this time, the mask portion of the bright field mask pattern is set to "255" in brightness, and in the profile extracted image, the defects such as the soil, scratch, etc. of the container 33, the profile of the contact lens insertion portion 33*a* and the position mark portion are also set to "255" in brightness. Therefore, if the difference value between the bright field mask pattern and the profile extracted image is subjected to such a binarizing processing that the brightness below "20" is automatically set to "0", the defects such as the soil, scratches, etc. of the container 33, the profile of the contact lens insertion portion 33*a* and the position mark portion are automatically set to "0" in brightness. Accordingly, the defects such as the soil, scratches, etc. of the container 33, the profile of the contact lens insertion portion 33*a* and the position mark portion can be removed from the inspection object. Thereafter, the subtracting image is binarized to obtain the binary image, and the binary image is subjected to the labelling process as shown in step ST59 of FIG. 12, and then to the tabling process (steps ST59, ST61). On the basis of the table thus obtained, the quality judgment (judgment on "good" or "bad") for the contact lens under the bright field illumination is performed in the same manner as the quality judgment for the container 33 (step ST63).

Since characters such as the logo mark, the numerals and the alphanumeric characters are not detected under the bright field illumination, it is unnecessary to remove the range of these characters from the inspection object. However, if these characters are detected even under the bright field illumination, the processing of removing the range of these characters from the inspection object is performed in the same manner as described above. In the steps ST55, ST57 and ST59, the profile of the contact lens is not actually detected, however, it is illustrated for convenience sake.

Contact Lens Inspection under Dark Field Illumination

Figure 13:
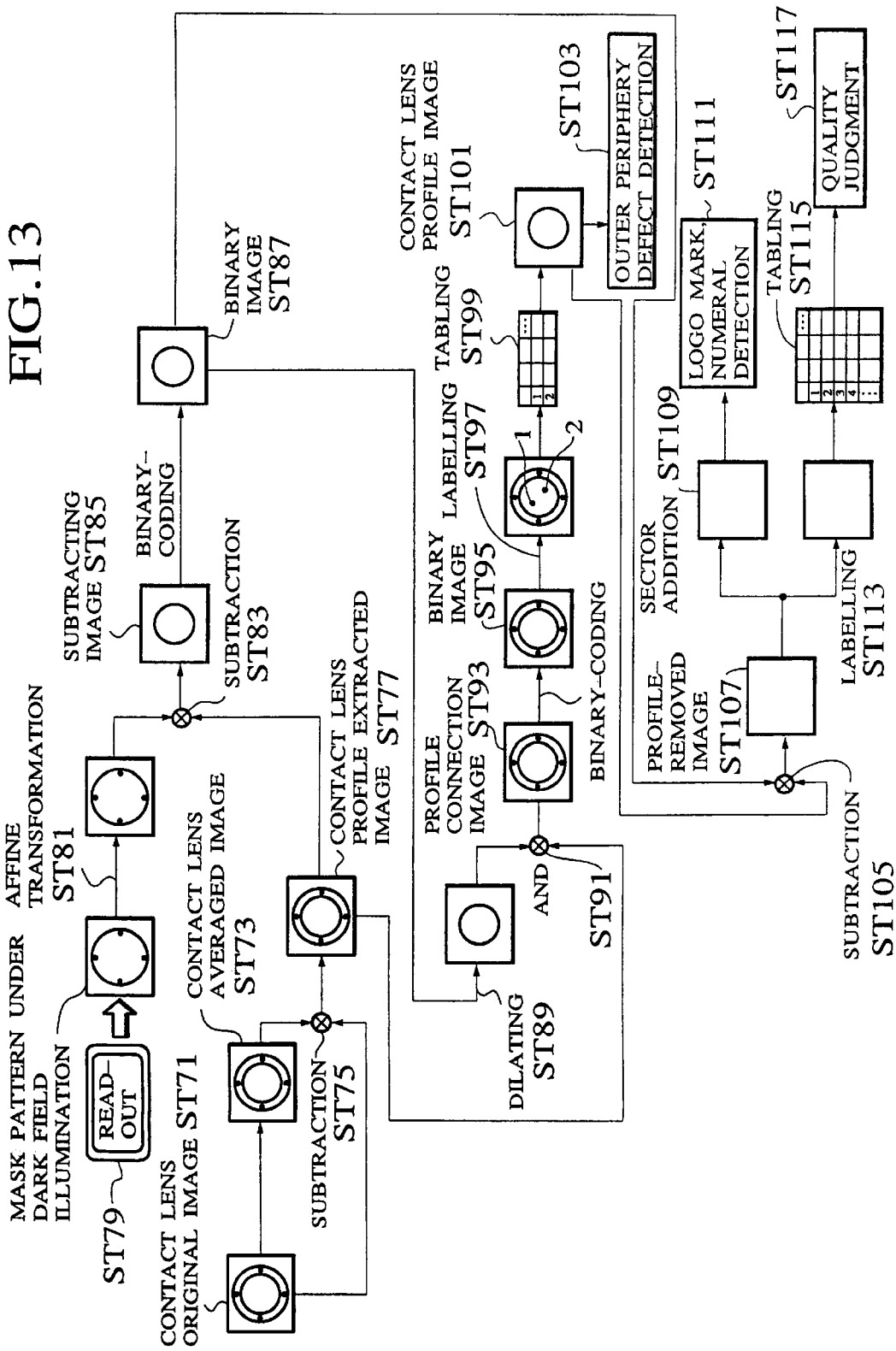
FIG. 13 is a diagram showing the flow of a contact lens inspection operation under dark field illumination.

Next, the contact lens visual inspection operation under the dark field illumination will be described with reference to a flowchart of FIG. 13.

Contact Lens Peripheral Defect Detecting Operation

The contact lens peripheral defect detecting operation under the dark field illumination will be first described.

The inspection controller 71 outputs an instruction of switching the illumination to the dark field illumination to the bright field/dark field illumination switching unit 47, whereby the current illumination is et to the dark field illumination. Thereafter, the inspection controller 71 controls the CCD camera 37 to image the contact lens insertion portion 33a of the container 33, thereby obtaining a contact lens original image (step ST71), and then applies an averaging filter to the contact lens original image at a predetermined number of times to obtain a contact lens averaged image which is made vague as a whole (step ST73).

Thereafter, the contact lens averaged image is subtracted from the contact lens original image to obtain a contact lens profile extracted image in which the defects such as the soil, scratches, etc. of the contact lens, the position marks, the profile of the contact lens insertion portion 33a, etc. are extracted in white color (steps ST75, ST77).

Subsequently, the dark field mask pattern and the gravity-center coordinate of the position marks which are stored are reads out (step ST79), and then the enlarging, reducing, rotating and parallel-displacing processing is conducted on the dark field mask pattern by the affine transformation to match the read-out gravity-center coordinate with the gravity-center coordinate which is calculated on the basis of the contact lens original image (step ST81).

Thereafter, the subtraction processing is conducted on the profile extracted image and the dark field mask pattern which is subjected to the enlarging, reducing, rotating and parallel-displacing processing to obtain a subtracting image (steps ST83, ST85), and then binarized to obtain a binary image (step ST87). Through this process, the defects such as the soil, scratches, etc. of the container 33, the profile of the contact lens insertion portion 33a and the position mark portion are removed form the inspection object.

At this time, when the mask portion of the dark field mask pattern is overlapped with the profile portion of the contact lens in the binarized image, the profile of the contact lens is cut out because of the subtraction processing of the profile extracted image and the dark field mask pattern which is subjected to the enlarging, reducing, rotating and parallel-displacing processing. Therefore, the binary image is subjected to the dilating processing as used to form the bright field mask pattern and the dark field mask pattern to connect the cut-out profile (step ST89).

Through the dilating processing, the profile is dilated in both of the x-direction and y-direction. Therefore, the image having the dilated profile and the profile extracted image are added with each other to obtain a profile-linked image in which the profile is linked (steps ST91, ST93).

The profile-linked image is binarized to obtain a binary image (step ST95). The binary image thus obtained is subjected to the labelling process as shown in step ST99 of FIG. 13, and then subjected to the tabling process (steps ST97, ST99).

At this time, since the binary image contains the profile portion of the contact lens, the circumscribing rectangle corresponding to the profile portion of the contact lens is larger than the circumscribing rectangles corresponding to the scratch, etc., and its size is fixed. Therefore, only the profile of the contact lens can be extracted on the basis of the size of the circumscribing rectangle to obtain the contact lens profile image (step ST101). In a polar coordinate with an origin according a center of the profile, a radius and an azimuth are calculated with respect to all pixels of the profile. Thereafter, the radius r of 480 points is calculated every 0.75° on the basis of the extracted profile.

In order to emphasize the peripheral defect, the values of the radius r are averaged by a weighting averaging method on the basis of 3 values, 9 values, 27 values, 81 values and 243 values, respectively.

Figure 14:
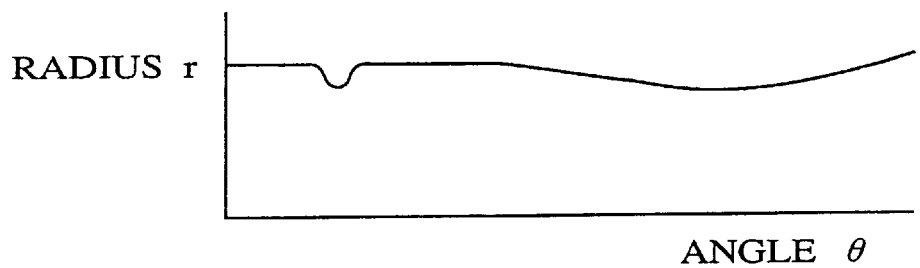
FIG. 14 is a graph showing variation of radius r with respect to angle θ obtained by the extracted profile of the contact lens.
Figure 15:
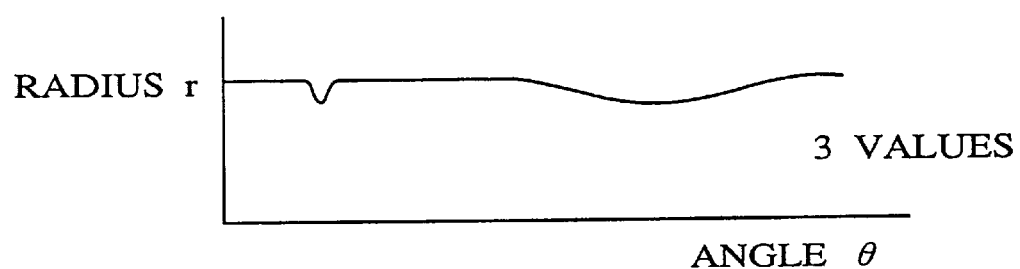
FIG. 15 is a graph showing variation of radius r with respect to angle θ when the values of radius r of FIG. 14 are averaged every three values.
Figure 16:
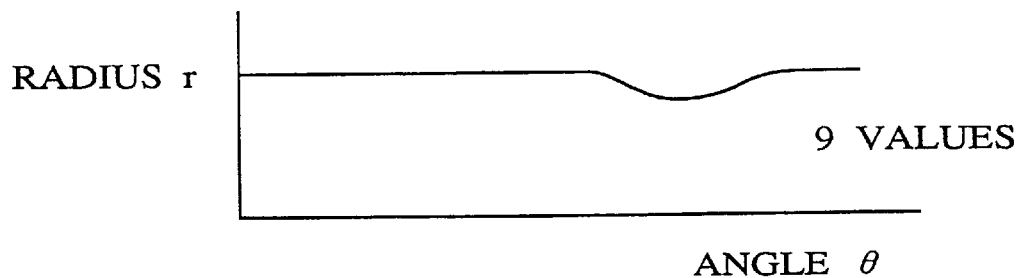
FIG. 16 is a graph showing variation of radius r with respect to angle θ when the values of radius r of FIG. 14 are averaged every 9 values.
Figure 17:
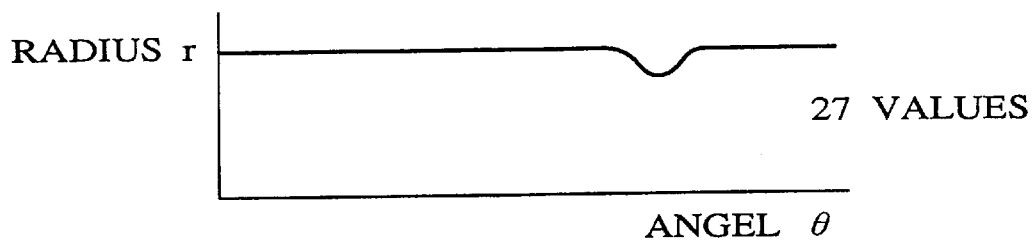
FIG. 17 is a graph showing variation of radius r with respect to angle θ when the values of radius r of FIG. 14 are averaged every 27 values.
Figure 18:
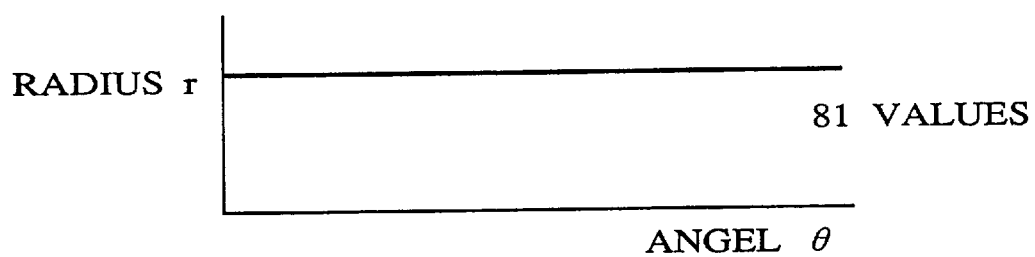
FIG. 18 is a graph showing variation of radius r with respect to angle θ when the values of radius r of FIG. 14 are averaged every 81 values.
Figure 19:
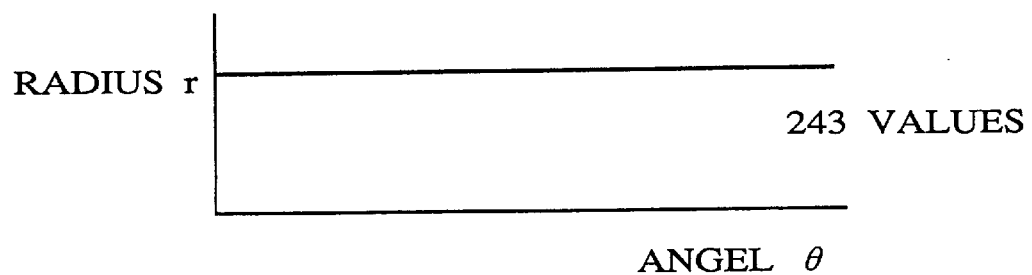
FIG. 19 is a graph showing variation of radius r with respect to angle θ when the values of radius r of FIG. 14 are averaged every 243 values.

For example, it is assumed that the values of the radius r as shown in FIG. 14 is obtained for the angle θ. In this case, the variation of the radius r obtained when the values of the radius r are averaged every 3 values (hereinafter referred to as "3-values averaging") is shown in FIG. 15, the variation for the averaging every 9 values (9-values averaging) is shown in FIG. 16, the variation for the averaging every 27 values (27-values averaging) is shown in FIG. 17, the variation for the averaging every 81 values (81-values averaging) is shown in FIG. 18, and the variation for the averaging every 243 values (243-values averaging) is shown in FIG. 19.

At this time, if a defect occurs in a narrow range, the defect is further emphasized by calculating the difference between the averaged values obtained by the 3-values averaging and the 9-values averaging and the difference between the averaged values obtained by the 3-values averaging and the 27-values averaging. On the other hand, if a defect occurs in a broad range as shown at the right side of FIG. 14, the defect is further emphasized by calculating the difference between the averaged values obtained by the 9-values averaging and the 27-values averaging and the difference between the averaged values obtained by the 9-values averaging and the 27-values Further, if a defect occurs in a broader range, the defect is further emphasized by calculating the difference between the averaged values obtained by the 27-values averaging and the 81-values averaging, the difference between the averaged valued obtained by the 27-values averaging and the 243-values averaging and the difference between the averaged values obtained by the 81-values averaging and the 243-values averaging.

If these emphasized defects exceed a predetermined value, these defects are judged to be bad (step ST103).

Detection of Logo mark, Numerals and Alphanumeric characters, and contact lens Defect Detecting Operation Next, the detection of the logo mark, the numerals and the alphanumeric characters of the contact lens and the inspecting operation for the defects such as the soil, foreign matters, scratches, breakage, peripheral damage, etc. of the contact lens using the dark field illumination will be described. First, the subtraction is made between the contact lens profile image and the binary image form which the defects such as the soil, scratches, etc. of the container 33, the profile of the contact lens insertion portion 33a and the position mark portion are removed, thereby obtaining a profile-removed image in which the profile of the contact lens is removed (steps ST105, ST107).

Figure 20:
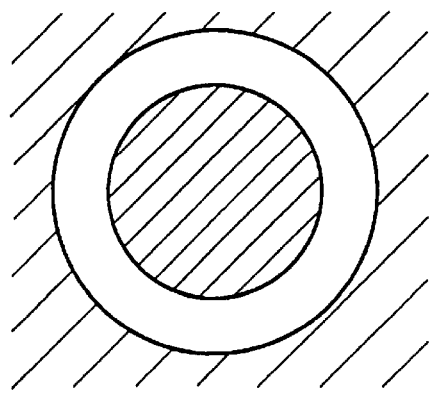
FIG. 20 is a diagram of logo mark, numeral detection mark.

At this time, the positions at which the logo mark, the numerals and the alphanumeric characters are stamped are predetermined, so that a donut-shaped mask for detecting the logo mark, the numerals and the alphanumeric characters is beforehand provided as shown in FIG. 20 to extract the brightness of only the above positions.

With the dark field mask pattern, the image in which the defects such as the soil, scratches, etc. of the container 33 and the profile of the contact lens are removed from the inspection object is logically added with the mask for detecting the logo mark and the alphanumeric characters. The result is divided into plural sectors every predetermined angle, and the number of pixels whose brightness is set to "255" is summed every sector (step ST109).

Figure 21:
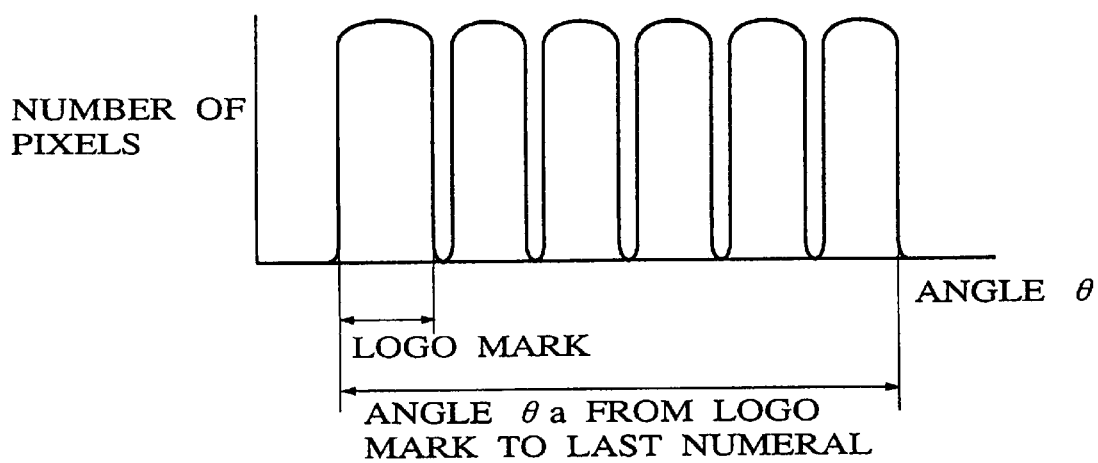
FIG. 21 is a graph showing variation of the number of pixels of predetermined brightness which are added every sector with respect to the position (angle θ) of plural sectors divided every predetermined angle.

FIG. 21 is a graph showing the summed pixel number with the position (angle θ) of each sector. From this graph, an angle θa ranging from the logo mark to the last number and an angle θb covering the alphanumeric characters shown in FIG. 22 can be known (only the portion of the angle θa is illustrated in FIG. 21), since the pixel number of the logo mark is difference from the predetermined number, whether the logo mark is stamped or not and the stamp position of the logo mark can be known (step ST111).

Figure 22:
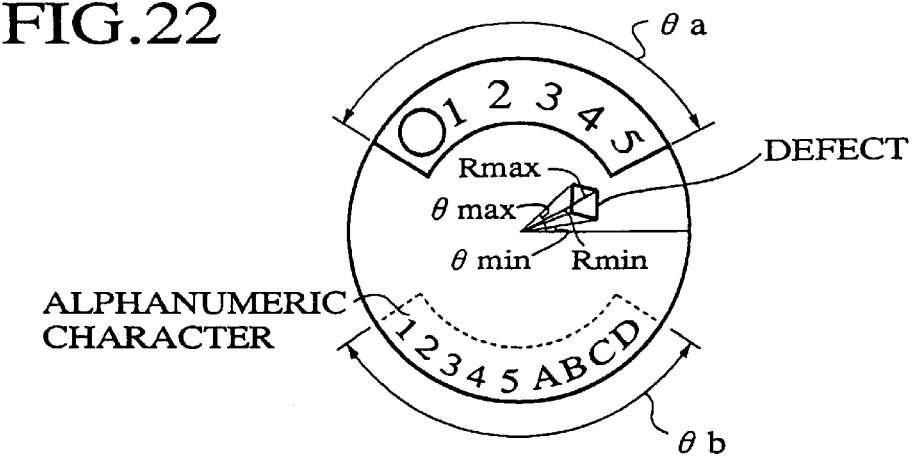
FIG. 22 is a diagram showing the minimum distance and the maximum distance from the center of the contact lens to a defect, and the maximum angle and the minimum angle from a reference point to a soil or scratch.

Thereafter, the labelling is conducted on the contact lens profile-removed image, and then the tabling is conducted (steps ST113, ST115). At this time, the minimum distance Rmin and the maximum distance Rmax from the center to the defect, the minimum angle θmin and the maximum angle θmax from the reference point to the defect, and the average brightness of the defect are added to the table as shown in FIG. 22.

Here, the profile-removed image contains the logo mark, the numerals and the alphanumeric characters. Therefore, any matter which exists within the angle θa ranging from the logo mark to the last numeral ("5" in FIG. 22) or within the angle θb covering the alphanumeric characters, is judged as the logo mark, a numeral or an alphanumeric character, and thus removed from the inspection defective object.

If the area, the width Wx, the width Wy and the average density of the defect such as the soil, scratch or the like are above predetermined values, it is judged to be bad (step ST117).

If the "bad" quality is judged through the container quality judgment, the contact lens quality judgement under the bright field illumination and the contact lens quality judgment under the dark field illumination, the images of the "bad" quality are stored. In this case, the operator can see the images of the defective samples after the contact lens visual inspection.

As described above, according too this embodiment, the container 33 is first imaged by the CCD camera 37 while fully filled with the preservation liquid using as the illumination the bright field illumination under which defects such as the black soil, scratches, etc. are easily detected, and the dark field illumination under which defects such as white soil, scratches, etc. are easily detected, and the center of gravity of the position marks id calculated. In addition, in order to prevent the defective portion such as the soil, scratch, etc. of the container 33 from being erroneously detected as the defective portion such as the soil, scratch, etc. of the contact lens, the bright field mask pattern and the dark field mask pattern are prepared, and then the external appearance of the container 33 is inspected. Thereafter, the contact lens is placed in the container 33 filled with the preservation liquid, and then imaged by the CCD camera 37 under the bright field illumination, and the center of gravity of the position marks is calculated. Further, the defective portion such as the black soil, scratch, etc. of the of the container is masked with the bright field mask pattern on the basis of the center of gravity of the position marks to detect the defects such as the black soil, scratches, etc. of the contact lens. Thereafter, the illumination is switched to the dark field illumination, and the contact lens is further imaged by the CCD camera under the dark field illumination. The defective portion such as the white soil, scratch, etc. of the container 33 is masked with the dark field mask pattern on the basis of the center of gravity of the position marks to detect the peripheral defect of the contact lens, the range of the logo mark, the numerals and the alphanumeric characters stamped on the contact lens and the defects such as the white soil, scratches, etc. of the contact lens.

Accordingly, the defects such as the soil, foreign matters, scratches, breakage, peripheral damage, etc. of the contact lens can be detected while the contact lens is placed in the contact lens insertion portion 33a of the container 33 which if filled with the preservation liquid.

In the contact lens visual inspection apparatus 1 of this embodiment, no restriction is imposed on the kind of the contact lens, and the visual inspection under the condition that the contact lens is placed in the container can be performed irrespective of the kind of the contact lens (soft contact lens, hard contact lens). Further, the contact lens visual inspection method and apparatus according to this invention is applicable to not only the contact lenses, but also other types of eye lenses such as in-eye lenses, etc.

According to the contact lens visual inspection method and apparatus of this invention, the container is imaged by the imaging device while the preservation liquid is filled in the contact lens insertion portion of the container, and the center of gravity of the position marks are calculated. In addition, an area which is unnecessary to perform the visual inspection of the contact lens placed on the container is extracted from the image of the container to obtain a mask image. Thereafter, the system containing the container filled with the preservation liquid and the contact lens placed in the contact lens insertion portion of the container (that is, the combination state of the container, the contact lens and the preservation liquid) is imaged as an inspection object by the imaging device to obtain an inspection object image. The inspection object image is overlapped with the mask image to subtract the mask image from the inspection object image and set the area of the obtained subtracted image as an visual inspection area, the defects such as soil, foreign matters, scratches, breakage, peripheral damages, etc. are detected for the visual inspection area.

Therefore, the contact lens visual inspection can be performed while the contact lens and the preservation liquid are provided in the contact lens insertion portion of the container, so that the visual inspection process can be rapidly performed without damaging (soiling, scratching, etc.) the contact lens during the visual inspection process.

What is claimed is:

1. A method of inspecting the appearance of a contact lens in a contact lens container, comprising the steps of:

filling a predetermined amount of preservation liquid into the contact lens container which does not contain the contact lens;

using an imaging pick-up device to image the contact lens container holding the predetermined amount of preservation liquid to form mask image data including any defects of the contact lens container and/or debris present, the mask image data including data of mask area which covers an inspection area;

inserting a contact lens into the contact lens container with the predetermined amount of preservation liquid;

imaging the contact lens in the contact lens container with a predetermined amount of preservation liquid to obtain inspection image data, the inspection image data including data of the inspection area;

processing said mask image data and said inspection image data to provide contact lens image data free of defect and/or debris data arising from the container holding the predetermined amount of preservation liquid, including subtracting the mask image data from the inspection data; and detecting contact lens defects from the contact lens image data to complete the inspection of the appearance of the contact lens.

2. The method of claim 1, further comprising:

applying an ultrasonic wave to the contact lens container holding the preservation liquid after the contact lens is inserted so as to deaerate any bubbles in the preservation liquid before the contact lens imaging step.

3. The method of claim 1, further comprising:

providing at least two position marks on predetermined positions of the contact lens container prior to the filling step; and wherein the first recited imaging step includes calculating a first coordinate value for each position mark in the mask image data, the second recited imaging step includes calculating a second coordinate value for each position mark in the inspection image date, and the recited providing step includes enlarging, reducing, rotating and parallel-displacing at least one of the inspection image data and the mask image dat on the basis of the difference between the first coordinate value and the second coordinate value of the position marks so that the inspection image data and the mask image data have the same orientation and magnification while undergoing the subtracting to form the contact lens image data.

4. The method of claim 1, further comprising:

stamping the contact lens with a concentrically arranged series of marks including at least one alphanumeric character; and further processing the contact lens image data, including, extracting brightness information from a predetermined part of the contact lens image data, dividing the brightness information into plural sectors occurring at predetermined angular intervals, summing the brightness information from each of the sectors, and detecting whether marks are properly stamped at said predetermined positions on the basis of the sum result.

5. The method of claim 1, wherein the step of providing contact lens image data further includes, obtaining brightness information as to pixels making up the contact lens image data, determining the periphery of the contact lens on the basis of the brightness information, calculating the distance between the extracted periphery and a center of the contact lens for a fixed number of angular intervals to obtain the same fixed number of plural distance values, calculating average value of the obtained distance values while varying the number of the distance values used for the averaging, and detecting peripheral damage to the contact lens on the basis of the differences in the plural average values.

6. The method of claim 1, wherein the using step to form mask image data includes expanding, by at least one pixel, the mask image data.

7. The method of claim 1, wherein said step of processing further comprises:

expanding, by at least one pixel, image data at a periphery of the contact lens to compensate for discontinuities introduced due to the subtraction of the mask image data from the inspection image data.

* * * * *